INVENTOR.
WAYNE C. HAZEN
ANGUS V. HENRICKSON
PABLO HADZERIGA
BY Sheridan and Ross
ATTORNEYS INVENTOR.
WAYNE C. HAZEN
ANGUS V. HENRICKSON
PABLO HADZERIGA
BY Sheridan and Ross

ATTORNEYS

United States Patent Office 3,425,799
Patented Feb. 4, 1969

3,425,799
RECOVERY OF PHOSPHATE VALUES FROM PHOSPHATIC SLIMES
Wayne C. Hazen, Denver, Angus V. Henrickson, Golden, and Pablo Hadzeriga, Arvada, Colo., assignors, by mesne assignments, to Hazen Research, Inc., a corporation of Colorado
Filed Aug. 14, 1964, Ser. No. 389,750
U.S. Cl. 23—107
Int. Cl. C01b 25/26
7 Claims

ABSTRACT OF THE DISCLOSURE

The process is peculiarly adapted to the recovery of phosphate values from colloidal slimes and comprises leaching the phosphate containing slimes with sulfuric acid under conditions which form crystals of calcium sulfate large enough to function as a filtering aid in filtering out colloidal clay, silica and other solid foreign material when the leach slurry is filtered after the addition of sulfuric acid. Large crystals of calcium sulfate are formed by the combined steps of adjusting the solids content of the slimes to about 6–14 percent and adding the sulfuric acid over a period at least one hour at a slurry temperature of about 50° C. to 80° C.

---

This invention relates to a method for the recovery of phosphate values from waste phosphatic slimes, more particularly, it relates to such a method utilizing crystallization and solvent extraction techniques.

In the United States today there are two major methods for manufacturing phosphoric acids from phosphate ore. These two methods are the electric furnace method and the wet process.

In the electric furnace method the phosphate ore is reduced in an electric arc furnace at a high enough temperature to vaporize elemental phosphorus. The elemental phosphorus is condensed and converted by oxidation and treatment with water to phosphoric acid of high purity. Because of this high purity the phosphate product can be used in the detergent and food industries. This higher purity product is produced at considerably higher cost than phosphoric acid made by the wet process.

In the wet process the phosphate ore is treated with sulfuric acid which converts the calcium phosphate in the ore to phosphoric acid solution and calcium sulfate. The calcium sulfate is removed by filtration, after which the solution of phosphoric acid can be evaporated to make concentrated acid for fertilizer or other use. Because of the impurities in the wet process phosphoric acid, such as iron, alumina, fluorine and other contaminants, fertilizer grade phosphoric acid is unsuitable for those products which find their way into the detergent or food industries. Its major outlet is for the production of triple superphosphate, ammonium phosphate, or other phosphate fertilizer products.

In the fertilizer business there is an increasing interest in the use of ammonium phosphate and the consumption of this material for fertilizer is increasing more swiftly than consumption of other phosphate products. Diammonium phosphate is made by reacting phosphoric acid and ammonia and crystallizing the resultant diammonium phosphate.

For the manufacture of phosphoric acid and also to produce phosphate rock which can be used as a starting point for making superphosphate, phosphoric acid and triple superphosphate, an upgrading process is used on the phosphate ore as mined. In Florida this upgrading process consists of washing and removing the slime clay fraction, followed by a benefication process of the phosphate rock in order to remove the impurities such as silica. The desliming process is also practiced on Tennessee phosphate ore.

During the desliming, from one-third to one-half of the contained phosphate values are discarded with the slimes. These slimes are removed, not only because they are refractory toward presently known upgrading processes, but they also interfere with the operation of the flotation on the remainder of the material. These slimes represent a tremendous loss of raw material as well as constituting an expensive nuisance since they must be impounded to prevent stream pollution.

Because the slime material is all —150 mesh in size and predominantly composed of particles less than 10 microns in diameter, it is exceedingly difficult to handle by any presently known technique, such as filtration, settling, etc. There is sufficient clay content so that the slimes will not settle to a very high density and they retain many of the disagreeable aspects of colloids. It has been found that several years are required before the solids will settle to a density as high as 20 percent solids. These slime materials constitute a very large tonnage of phosphate which has already been mined and is available. They have been the subject of a vast amount of thought and experimental research. To date the only method of treating the slimes which has held out much hope is to pond them in such a way that over a period of years they will drain and the land can perhaps be reclaimed for agricultural use. This does not solve the problem of producing a saleable phosphate product for the slimes.

If ordinary methods of producing wet process phosphoric acid are attempted using this slime as a feed material, there are a number of problems which prevent economic recovery of phosphoric acid. First the material is so difficult to filter or thicken that there is no present commercial way to make the separation between the clay solids remaining after acid leaching and the phosphoric acid in the solution produced by the sulfuric acid addition. Secondly, even if methods were available, the high water content of the feed slimes would mean that the phosphoric acid would be exceedingly dilute. This means a prohibitive evaporation cost to concentrate this dilute phosphoric acid to a point where it can compete with the acid produced from the higher grade phosphate rock.

It is therefore an object of this invention to provide a method for economically recovering a saleable phosphate product from phosphate bearing materials in general including waste colloidal slimes from conventional processes for the recovery of phosphate values from phosphate rock.

It is another object of this invention to provide a process for the recovery of phosphate values from waste phosphate slimes by which phosphate rock particles are effectively separated from colloidal clay, silica and other solid foreign material.

Another object of the invention is to provide an effective method for separating calcium sulfate from phosphate values in leach solutions of phosphatic slimes.

Another object of the invention is to provide an effective method for recovering phosphate values from leach solutions in which they exist in low concentrations.

A further object of the invention is to provide a method for solvent extraction of phosphate values from dilute solutions and effective stripping thereof from the solvent.

In accordance with the invention, the process comprises leaching phosphate containing materials including waste phosphatic slimes with sulfuric acid under conditions which form crystals of calcium sulfate large enough to function as a filter aid, filtering the leached slimes to remove most of the solid foreign material, treating the leach liquor with a cation exchange agent to remove iron and aluminum, removing phosphate values from the leach liquor by solvent extraction with an amine solvent, and stripping the phosphate values from the solvent with ammonia to recover them as diammonium phosphate. To form crystals of the required size the slimes are reduced to a solids content of not more than about 6–14 percent and the required amount of sulfuric acid added with agitation over a period of at least one hour at a temperature between about 50° C. and 80° C. peferably followed by agitation for a period of about one hour. A modification of the invention is the recycling of a portion of the leached slimes to the leach circuit before the next filtration to provide seed crystals of gypsum. A further modification is adjustment of the concentration and pH of the stripping solution by use of countercurrent stripping stages to provide for selective recovery of the desired phosphate by crystallization.

The invention is illustrated herein by its application to the recovery of phosphate values from waste phosphate slimes but it is by no means restricted in application to this starting material as it is likewise applicable to phosphate containing materials in general, and particularly, to low grade phosphate materials.

The invention will be explained by reference to the accompanying drawings in which, FIG. 1 is a flowsheet illustrating the process of the invention;

FIGS. 3–8 are photomicrographs showing crystals of calcium sulphate formed by the treatment of phosphatic slimes with sulfuric acid under conditions, in which FIG. 3 shows the effect of rapid addition of acid on crystal formation;

FIG. 4 shows the effect of temperature on the formation of crystals;

FIGS. 5, 6 and 7 show the effect of the time period over which acid is added on crystal formation, and FIG. 8 shows the effect of seeding on crystal formation;

FIG. 9 is a plot of isotherms obtained with a variety of solvent and diluent combinations.

Figure 1:
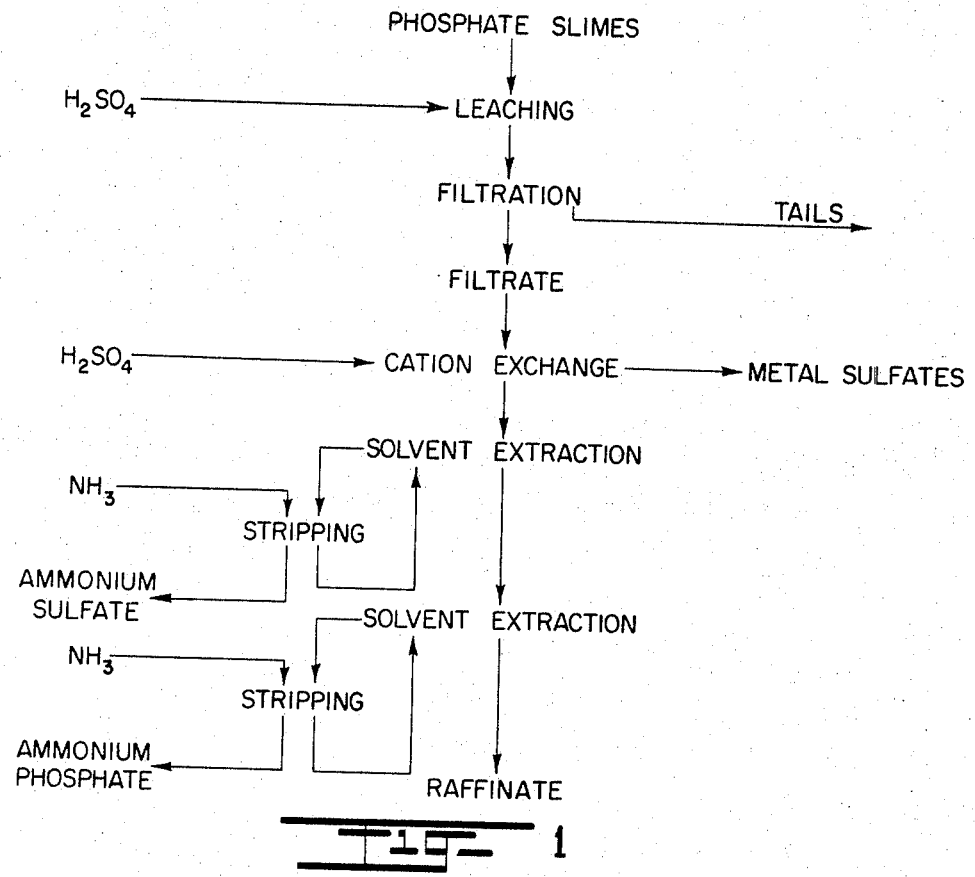

Reference is now made to the flowsheet of FIG. 1 which illustrates the process of the invention applied to phosphate slimes resulting from desliming in the treatment of phosphate rock by conventional processes to recover phosphate values.

The slimes are leached with sulphuric acid, the conventional leaching agent for the treatment of phosphate rock to recover phosphoric acid. Since phosphoric acid is removed from the leach liquor by solvent extraction, there is no particular requirement in the acid leaching that the pulp density during leaching be such as to produce a concentrated phosphoric acid. Accordingly, an ordinary agitation leach comparable to that used in the uranium industry for dissolving uranium with sulfuric acid was used.

In order to test the process it is important to know the acid consumption requirements of the slimes being tested. The sulfuric acid which is consumed during the leaching of phosphate rock is a function of the $P_2O_5$ content of the rock and of the other acid soluble constituents. The presence of calcium carbonate results in very high acid consumption. In the case of the Florida slimes which were investigated rather intensively, the carbonate content is small, but the proportion of alumina and iron present is high. Since this has an important effect on the acid consumption, tests were made to determine the extraction of $P_2O_5$ from the Florida phosphate slimes as a function of the quantity of sulfuric acid added.

The following procedure is typical of that used to determine acid consumption: Material from a sample of Florida phosphate slimes having a $P_2O_5$ content (dry basis) of 15.4 percent and weighing 453.8 grams, at a pulp density of 10 percent solids, was heated to 60° C. while being gently agitated. To this pulp, 14.8 grams of sulfuric acid was added over a period of two hours. This is a ratio of 2.0 pounds of acid per pound of $P_2O_5$ percent in the heads. When the addition was complete the slurry was stirred for an additional hour, after which it was filtered. The cake was washed with water until no more acid was in the filtrate, dried, weighed and assayed. The final pH of the pulp prior to filtration was 1.8. Additional tests were made using ratios of 2.4, 2.6 and 2.8 pounds of sulphuric acid per pound of $P_2O_5$ contained in the slime sample. The percent extraction of the phosphate contained in the slimes was plotted as a function of the sulfuric acid to $P_2O_5$ ratio. The plot showed that a maximum extraction of 92 percent of the $P_2O_5$ was obtained when 2.6 pounds of sulfuric acid were added for each pound of $P_2O_5$ contained in the heads.

As mentioned previously, one of the big problems in recovering phosphate values from waste phosphatic slimes is the separation by filtration or otherwise, of solid calcium sulphate from the phosphate values in solution. Filtration rates of slimes leached by addition of sulfuric acid in the conventional manner are impossibly slow. It was found that if sulfuric acid is added under conditions which result in the formation of proper size crystals of calcium sulfate, the crystals act as a filter aid and successful filtration is effected.

The reaction between the phosphate rock and sulfuric acid causes about three pounds of gypsum crystals to be precipitated for each pound of $P_2O_5$ which is dissolved from the rock. The net result is that after leaching, the solids remaining are nearly 50 percent gypsum by weight. By using the appropriate crystallization technique these gypsum crystals can be caused to grow large enough so that they effectively trap the clay slimes during filtration and the net result is that ordinary filters become economical.

A set of conditions for leaching Florida slimes with sulfuric acid was developed which causes the growth of gypsum crystals to such large size that they constitute a satisfactory "filter aid" for filtration of the leach residue with filter capacities of 300–400 pounds of filter cake (at 40% solids) per square foot of filter area per 24 hours. The 40 percent solids filter cake is dry enough so that it can be handled on a conveyor belt and stacked in piles. The acid consumption during a standard leaching of the Florida slimes is 2.8 pounds of sulfuric acid consumed per pound of $P_2O_5$ dissolved.

In accordance with prior art processes, phosphoric acid may be solvent extracted from leach solutions formed by the treatment of phosphate rock with hydrochloric acid, the extracting agent being tri-butyl phosphate in one method and 4–5 carbon chain aliphatic alcohols in another method. While both of these methods are operable for extracting phosphoric acid from high chloride content solutions, neither seems to be operable on dilute phosphoric acid solutions obtained by the treatment of phosphate rock or phosphate slimes with sulfuric acid.

Long chain organic amines will extract anions, including sulfate, and in fact, these reagents were developed in the uranium industry for the extraction of the anionic form of uranium which exists in sulfate solution. Since these amines are chemically considered to be bases they would be expected to react with phosphoric acid to form the organic amine phosphate.

The preferred amine extractants are those in which the alkyl substituents have six or more carbon atoms in the chain, including branched chain alkyl radicals. Examples are tri-lauryl amine which is a tertiary $C_{12}$ straight chain amine, tri-caprylyl amine, a tertiary amine, di-lauryl amine, a secondary straight chain amine, do-decenyl-tri alkyl methyl amine, a homologous mixture containing 24–27 carbon atoms, a secondary amine, and tri-alkyl methyl amine, a homologous mixture containing 18–24 carbon atoms, a primary amine. The chemical compounds or compositions represented by trade names used herein are as follows: "Alamine" is the trade name for tri-capryl amine. "Amberlite LA-1" is the trade name for dodecenyl-trialkylmethylamine. "Dowex 50W–X8" is the trade name for a cation exchange agent, sold by the Dow Chemical Company of Midland, Mich., which is a strongly acid sulfonated styrene divinyl benzene. The cation exchange agent or material is one which contains what might be referred to as a solvent interfering cation. The material contains $H^+$ as the cation which is exchanged or replaced by cations of iron, aluminum and other metals which exist as impurities. There are a number of equivalent cation exchange agents available on the market having this general composition which can be used.

The problem in connection with the use of amine solvents is not so much from the extraction standpoint, but rather the difficulty of stripping the phosphate from the loaded solvent. Since they are salts (amine phosphates) stripping them with water by a hydrolysis reaction yields solutions of phosphoric acid that are very dilute. Stripping may be accomplished by using storage acids but this results in a mixture of the stripping acid with the phosphoric and presents the problem of converting the amine after stripping to the free-base form for return to the extraction circuit. However, if the final product can be ammonium phosphate rather than phosphoric acid, then it is possible to use ammonia for stripping, thereby removing the phosphate from the solvent and at the same time converting the solvent to the free-base form for recycle.

Experiments proved that the extraction was not as straight forward as expected due to the formation of emulsions from the presence of cations, such as, aluminum and iron, which had to be removed before complete extraction of the phosphate was achieved without emulsion formation.

A number of solvent extractants were tested, and while a low distribution coefficient and low loading were experienced for some of the solvents, they were effective in general for extraction. Some solvents were more effective than others, for example, isotherms were obtained on the extraction of the dilute phosphoric acid which showed that 98 percent extraction of the phosphoric acid could be extracted in a four-stage countercurrent circuit using a 20 percent tertiary amine dissolved in an aromatic solvent, such as benzene.

The flowsheet shows a preliminary selective stripping step for removing ammonium sulfate from the loaded solvent. Since there is inevitably residual sulfate in phosphoric acid which is produced by the sulfuric acid leaching of phosphate rock, this sulfate must be accounted for in the solvent extraction by an amine extractant. It was found that sulfate extracts more strongly than phosphate and therefore will be extracted first. Whether the amount of sulfate which would be produced as ammonium sulfate with the ammonium phosphate in the stripping circuit will be detrimental depends upon the specifications of the product. With many slimes and ores the sulfate stripping step will not be necessary and the ammonium phosphate can be stripped directly. If the quantity of sulfate present is more than that which can be tolerated in the final product, then it will be possible to operate a first stage extraction in which a small quantity of solvent is loaded up preferentially with sulfate and stripped in a separate stripping circuit with ammonia to produce ammonium sulfate. Although this does introduce an additional step, it is not a serious one and it permits the recovery of some of the excess sulfate which was used in the leaching.

One of the major advantages of this solvent extraction system is that in stripping with ammonia gas it is possible to operate under circumstances such that the solubility of ammonium phosphate salts is exceeded in the stripping circuit and the crystalline final product can be produced directly during stripping without the necessity of having a separate crystallizer. By using the appropriate number of stages and proper control it is possible to produce a mixture of mono-ammonium and di-ammonium phosphate if desired, or a relatively pure di-ammonium phosphate alone. As the various phosphates crystallize at different pH values, the required number of countercurrent stages can be used to provide saturation of the stripping solution and the required pH for the selective recovery of the desired phosphate. Since the system provides for the removal of aluminum and other cations and the sulfate content can be controlled, it is possible to produce a di-ammonium phosphate of almost any desired purity.

The results showed that the loaded solvent from the extraction circuit can be stripped completely of its phosphate content with gaseous ammonia under circumstances which produce a strip liquor of such high concentration that ammonium phosphate crystals are produced during the stripping operation. There was no entrainment of organic material on the solid crystals produced and they settled completely into the aqueous phase without emulsion.

The process can be used on ore without desliming or flotation for upgrading because it is not necessary to have a high concentration of phosphoric acid produced during the leaching operation.

Leaching and filtration

A number of examples are included below which show the results of tests made to determine the optimum process limitations for forming the required type of crystals of calcium sulfate which are effective as a filtration aid. The following table lists the available analyses for the samples of phosphatic material used.

| Sample: | Percent Solids | Percent $P_2O_5$ | Percent $Al_2O_3$ | Percent FeO | Percent F | Percent $SiO_2$ |
|---|---|---|---|---|---|---|
| 1 | 16.0 | 15.4 | | | 1.3 | |
| 2 | 12.7 | 9.4 | | | | |
| 3 | 13.1 | 11.6 | | | | |
| 4 | 9.4 | 7.7 | | | | |
| 5 | 52.0 | | | | | |
| 6 | 30.0 | 3.0 | 1.0 | 0.9 | 0.12 | |
| 7 | 52.6 | 0.90 | 0.77 | 2.2 | 0.03 | |
| 8 | 18.3 | 1.96 | 1.52 | 1.4 | 0.07 | |
| | | 1.4 | 0.9 | 2.3 | 14.7 | |

Samples 1–4 were Florida phosphatic slimes, Sample 5 was green phosphoric acid from Utah, Samples 6 and 7 were dilute and concentrated fertilizer grade phosphoric acid respectively, Sample 8 was phosphate ore from Wyoming.

Filtration tests were performed using a 0.1 square foot filter leaf. After some experimentation it was decided that the best filter media to use was a polypropylene multifilament twill cloth. Vacuum used ranged between 15 and 18 inches.

EXAMPLE 1

Figure 2:
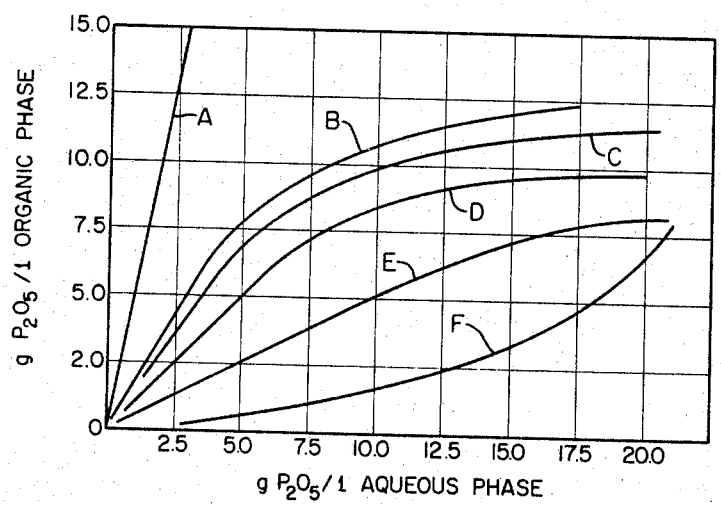
FIG. 2 is a photomicrograph of solid material of unleached phosphatic slimes.
Figure 2:
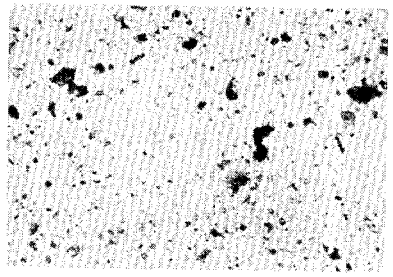

A blank was run to test the filterability of untreated Florida slimes. Leaf filtration tests were run on material from the No. 1 sample diluted from the 16% solids to 10% solids content with distilled water. Leaf filtration tests were also run directly on the slimes. The filtration rate was so low as to be practically non-existent. The filtrate which was obtained in all cases was very cloudy and at best the filter cake was never more than 1/16 of an inch thick no matter how long the leaf was left in the stirred slurry. The thin slime coating on the filter cloth could not be blown off with air pressure as it had effectively impregnated the cloth. Several efforts to improve filtration of the original slime material through addition of reagent and changes in procedure were uniformly unsuccessful, and the conclusion was reached that the slimes are not filterable in any ordinary commercial sense. FIGURE 2 is a photomicrograph taken of untreated material from Sample 1, a Florida slime. This figure serves as a blank for comparison with other figures showing the results of the application of various process limitations to the filtration step.

EXAMPLE 2

Figure 3:
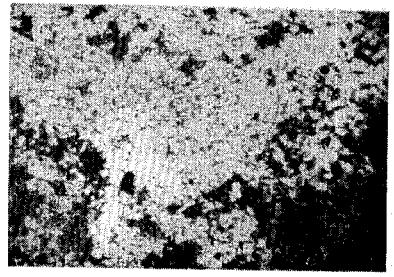

Example 2 was performed to show the effect on formation of calcium sulfate crystals of the rate of addition of acid. It was found that if sulfuric acid is added swiftly to the slimes during agitation the gypsum crystals which are produced are exceedingly small. The filtration rates are very low and are nearly the same order of magnitude as untreated slimes. It was also found that the small crystals were formed regardless of the temperature or solids content whenever the sulfuric acid was added swiftly. In one test, sulphuric acid was added swiftly to material from Florida Sample No. 1 at 60° C., followed by one hour of agitation after the addition of acid. FIG. 3 is a photomicrograph of a sample of the leached slurry, the magnification in this photograph being 200×. The average crystal size is less than −325 mesh and the crystals were ineffective as a filter aid. Further tests were run in which the sulfuric acid was added to the slimes in the proper amount over a period of ten minutes, followed by periods of agitation for as long as 24 hours at 60° C. Examination of these leached slurries at various times during this agitation always showed the same small size gypsum crystals, and there was apparently no further growth.

EXAMPLE 3

Figure 4:
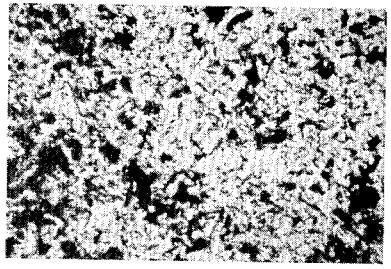

Tests were made to determine the effect of temperature on crystal formation. Using material from Sample No. 1 having a solids content within the operable range, sulfuric acid was added slowly over a period of two hours, followed by an additional hour of digestion, all at room temperature. FIG. 4 shows the gypsum crystals formed, the average size being about 325 mesh. Tests on the Florida slimes 1–4 showed that with exactly the same set of leach conditions an improvement in the growth of gypsum crystals was obtained by increasing the temperature to about 50° C. No particular improvement was found until 50° C. was reached, after which improvement was marked in the temperature range between 60° C. and 70° C. At 80° C. there was a noticeable increase in the viscosity of the acid leached slurry and even at 10 percent solids it was not possible to achieve a smooth agitation condition. Above 80° C. it was not possible to make an acid leach in which the gypsum crystals were of a proper size to fuction as a filtration aid.

EXAMPLE 4

Figure 5:
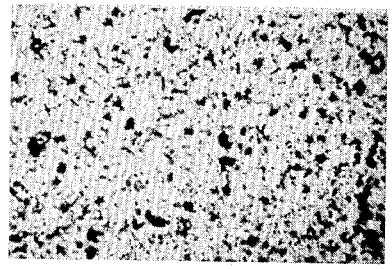
Figure 6:
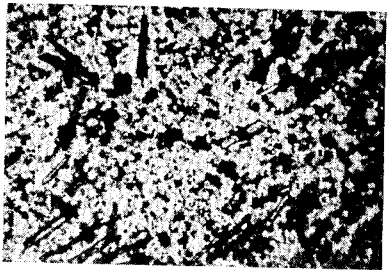
Figure 7:
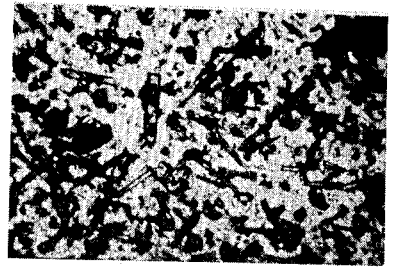

A short series of qualitative tests using the microscope for examination of the slurry showed that if the sulfuric acid were added at a constant rate over a period of at least one hour while the slurry was held at 60° C. crystal growth could be induced. An addition period of at least two hours is preferred. An additional hour for digestion after the end of the addition of sulfuric acid was found to be beneficial. FIGS. 5, 6 and 7 show the increase in size of the gypsum crystals in a leached pulp at various stages of a leach in which sulfuric acid was added to Florida slimes from Samples 1–4 over a period of two hours at a uniform rate, followed by one hour of gentle agitation for digestion. The leach temperature was 60° C. for this test, and as can be seen, the gypsum crystals had grown to a large size upon completion of the procedure. FIG. 5 shows the crystals after about ⅓ of total acid had been added, the gypsum crystals averaging less than 400 mesh in size. FIG. 6 shows the crystals after the addition of about ⅔ of total acid, the gypsum crystals having a maximum size of about 150 mesh. FIG. 7 shows the crystals after total acid addition of acid followed by one hour of digestion, the gypsum crystals maximum size being about 100 mesh. This size is highly suitable as an effective filter aid. When circumstances of the leach were such that the gypsum crystals were very large in size, filtration rates of between 300 and 400 pounds of wet filter cake (40–45% solids) per square foot of filter cloth area per 24 hours were obtained. Tests showed that the solids content of the slimes is an important factor in the formation of the proper size crystal. When the slimes are at a solids content between about 6 and 14 percent the agitation can be performed smoothly under circumstances which permit growth of larger gypsum crystals than are obtained by a more violent type of agitation. When the pulp density was much higher, the agitation intensity had to be increased meterially in order to provide a reasonable distribution of the sulfuric acid as it was added. A preferred solids content for typical Florida slimes is 10 percent. It was not possible to provide smooth and uniform agitation of the slimes at solids content higher than about 14 percent, therefore a preferred 10 percent solids pulp density was used throughout the test work. Because of the marked variation in clay type and content of slimes from different areas, the maximum of 14 percent solids will not hold for all cases. As stated above, an operative range for the solids content is between about 6 and 14 percent.

EXAMPLE 5

Figure 8:
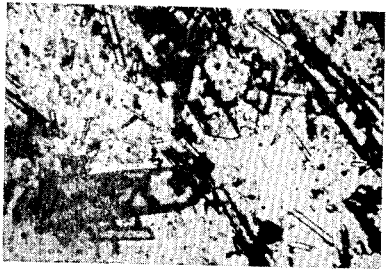

It was found that crystal growth induced by slow addition of sulfuric acid at 60° C., and proper pulp density is improved even further if a portion of the leached slimes before filtration is recycled to the leach circuit to provide seed crystals of gypsum. FIG. 8 shows a photomicrograph of the crystals which were produced by recycling 10% of the total weight of a leached slurry of Florida slimes to another batch of fresh slimes. The crystals have a maximum size of 48 mesh.

The results of the crystal formation tests showed that leaching of colloidal phosphatic slimes can be performed under conditions which result in the formation of crystals of adequate size to constitute a filtering aid such that solid calcium sulfate and other solid foreign material can be effectively separated from the phosphate values in solution.

Extraction

As previously mentioned, the preliminary extraction test work showed that when the phosphoric acid concentration had been reduced through extraction eventually various precipitates began to form, which interfered seriously with the subsequent solvent extraction because of emulsion formation. These precipitates are solid phosphates of aluminum, iron and other cation impurities. The following example was performed to test the efficiency of a cation resin for the removal of these cations.

EXAMPLE 6

A small quantity of "Dowex 50W-X8" cation resin in the hydrogen form was placed in a 1-inch diameter tube and leach liquor obtained by leaching a sample of Florida slime and filtering was passed through at a rate of 10 ml. per minute. The analyses of these solutions showed .9 gram per liter of aluminum ion and .3 gram of ferric iron per liter in the feed. The phosphoric acid concentration was 16 grams per liter $P_2O_5$. The solution issuing from the bottom of the column contained only traces of aluminum and iron. The pH of the influence solution was 1.7 while that of the discharge was 1.3, indicating that exchange had taken place between the cations and hydrogen ion on the resin. The solvent extraction work on the liquor issuing from the ion exchange column was free of emulsions, indicating that the removal of cations had overcome this problem. The cation exchange resin was eluted with sulfuric acid, after which it was ready for re-use.

As the flowsheet shows, the final extraction step follows the cation removal step. Isotherms showing the extraction of phosphoric acid from relatively concentrated pure solutions using a $C_8$-$C_{10}$ straight chain tertiary amine (General Mills' "Alamine 336") indicated that 98.5 percent extraction could be obtained in four stages of extraction with a solvent loading of 40 grams per liter as long as the initial solution was relatively concentrated in phosphoric acid. Because the leach liquor obtained by leaching Florida slimes will contain only a few percent phosphoric acid rather than the 30 percent obtained from acid leaching of phosphate rock, the solvent extraction of more dilute phosphoric acid must be accomplished. Tests showed that solvent systems effective for stripping from concentrated solutions of phosphoric acid are not necessarily effective on dilute solutions.

In order to improve the extraction coefficient and ultimately the loading of the solvent, tests were made using Florida phosphate slimes on the effect of various diluents on extraction coefficient. FIG. 9 shows isotherms of various solvent systems.

The solvent systems represented by the various curves A–F are as follows:

A—20% Alamine–20% Decanol–60% $C_6H_6$
B—10% Alamine–10% Decanol–80% $CHCl_3$
C—10% Amberlite LA-1–10% Decanol–80% $C_6H_6$
D—10% Alamine–10% Decanol–80% $C_6H_6$
E—10% Alamine–10% Decanol–80% Solvesso
F—10% Alamine–90% $C_6H_6$ The isotherms show that all of the solvent systems are operative; however, the very high extraction coefficient which was obtained when the concentration of the tertiary amine was increased and benzene used as a diluent demonstrated the effectiveness of this solvent system.

The question of how much sulfate may be permitted to go along with the phosphate can only be resolved on the basis of the required specifications of the final product. In one test a leach liquor containing 11.9 grams per liter of $P_2O_5$ and 4.58 grams per liter of sulfate was subjected to successive solvent extraction steps using a tertiary amine-isodecanol solvent in kerosene diluent. The first four stages of extraction removed 100 percent of sulfate ion and only 13.3 percent of the $P_2O_5$. The fact has been clearly demonstrated in various tests that the sulfate ion is much more strongly bound by the amine solvent than is the phosphate and this can be used as the basis for a separation between sulfate and phosphate in the standard way.

The extraction tests demonstrated that the phosphate values can be effectively extracted with amine solvents from leach solutions resulting from the leaching of phosphate slimes in accordance with the above described leaching procedure.

Stripping

In accordance with the flowsheet, the final step in the process is stripping the phosphate values from the loaded amine solvent. Since the final product desired is ammonium phosphate, ammonia was used as the stripping agent. However, the invention is not limited to ammonia as a stripping agent unless the product required is an ammonium phosphate. Alkali metal stripping agents, such as sodium and potassium hydroxides and carbonates may be used if alkali metal phosphates are the desired final products. Water is, of course, used as required.

In the preliminary exploratory work the various loaded solvents were stirpped by agitation with a small quantity of water while ammonia gas was blown into the mixer. It was soon found that the ammonia was capable of completely stripping the phosphate from the amine and if the quantity of water was low enough so that it would become saturated with respect to one of the various ammonium phosphate salts, then crystals of the ammonium phosphate would form in the aqueous phase when the mixture was allowed to settle. Because it is possible to use a countercurrent system in which the pH can be controlled at any desired value in the first mixer settler stage where the loaded organic first meets an ammoniacal solution, it is possible to precipitate either the monoammonium or the diammonium phosphate.

In the next stage where the solubility of the phosphate salts need not necessarily be exceeded an excess of ammonia can be used to assure complete stripping. The aqueous phase from this second stage then goes in a countercurrent fashion to provide the solution for the first stage and for the crystallization of the ammonium phosphate.

Figure 10:
FIG. 10 is a photograph of a magnification of 26× of ammonium phosphate crystals produced by stripping an amine solvent with ammonia after extraction of phosphate values from leach liquor with the solvent.

Many batch stripping tests using an excess of ammonia were performed. FIG. 10 is a photograph at a magnification of 26× of some of the ammonium phosphate crystals which were produced by stripping an amine with ammonia after extraction with amine solvent from a leach liquor formed from Florida slimes.

The stripping tests demonstrated that the phosphate was completely removed from the amine solvent by treatment with ammonia gas, that crystalline ammonium phosphate can be produced, and that there was no excess ammonia carried back to the leaching circuit from the strip circuit. There was no visible evidence of organic solvent clinging to the crystallized salts. The phosphate crystals settled clearly and cleanly into the aqueous phase without entraining any organic material.

The above description and supporting examples illustrate that a combined process for the effective recovery of phosphate values in saleable form from phosphatic slimes has been provided. The process provides an effective method for separating calcium sulfate from phosphate values in leach liquors resulting from the treatment of phosphatic slimes with sulfuric acid. An effective solvent extraction procedure is provided for recovering the phosphate values from the leach liquor, the process being adaptable for operation in the presence of iron and aluminum ions. The process includes a final stripping step for stripping phosphate values from the solvent extractant and recovering them as the required phosphate. If an ammonium phosphate is the required final product the concentration of the stripping medium can be adjusted to provide the product in crystalline form.

Although the invention has been illustrated and described with reference to the preferred embodiments thereof, it is to be understood that it is in no way limited to the details of such embodiments, but is capable of numerous modifications within the scope of the appended claims.

What is claimed is:

1. The method of recovering phosphate values from a mixture comprising clay and phosphate slimes having an average particle size not in excess of 10 microns in diameter, which method comprises: adjusting the solids content of the mixture of slimes to between about 6 to 14 percent by weight; adding to the mixture at a temperature of about 50° C.–70° C. over a period in excess of one hour at a substantially constant rate at least the amount of sulfuric acid required to leach the phosphate values present to form large crystals of gypsum; filtering the resulting slurry whereby the large crystals of gypsum trap the clay slimes and serves as a filter aid; extracting the phosphate values from the filtrate by solvent extraction; and stripping the phosphate values from the solvent.

2. The method of claim 1 in which the solids content of the mixture of slimes is adjusted to about 10 percent by weight; and the sulfuric acid is added over a period of about 2 hours at a temperature between about 60° C. and 70° C. to form large crystals of gypsum.

3. The method of claim 1 in which a portion of the leached unfiltered mixture of slimes leached in accordance with the method of claim 1 is recycled to untreated clay and phosphate slime mixture before the untreated mixture is leached and filtered.

4. The method of claim 1 in which a solvent extraction system containing an amine solvent is used consisting essentially of 20 percent amine solvent for the phosphate values dissolved in an aromatic solvent.

5. In the method of recovering phosphate values from a mixture comprising clay and phosphate slimes having an average particle size not in excess of 10 microns in diameter and a $P_2O_5$ content not in excess of about 15.4 percent in which the mixture of slimes is leached with sulfuric acid to convert at least a portion of the phosphates present to phosphoric acid and the formed slurry filtered to provide a leach solution as a filtrate, the improvement which comprises: adjusting the solids content of the mixture of slimes to between about 6 to 14 percent by weight; adding the sulfuric acid at a substantially constant rate over a period from about 1 to 2 hours at a temperature between about 50° C.–70° C. to form relatively large crystals of gypsum to serve as a filtering aid when the leach slurry is filtered; and filtering the leach mixture.

6. The improvement of claim 5 in which 2–2.8 pounds of sulfuric acid per pound of $P_2O_5$ dissolved from the mixture of slimes is added to provide about three pounds of gypsum crystals per pound of $P_2O_5$ dissolved having an average size in excess of about 325 mesh and upon filtering a filter cake of at least 35 percent solids is obtained.

7. The improvement of claim 6 in which a portion of the leached unfiltered mixture of slimes is recycled to untreated clay and phosphate slime mixture before the untreated mixture is leached and filtered.

References Cited

FOREIGN PATENTS

| 896,016 | 5/1962 | Great Britain. |
| 3,811,105 | 4/1963 | Japan. |

OSCAR R. VERTIZ, *Primary Examiner.*

HOKE S. MILLER, *Assistant Examiner.*

U.S. Cl. X.R.

23—122, 165, 309